United States Patent
Adams et al.

(10) Patent No.: US 9,552,472 B2
(45) Date of Patent: Jan. 24, 2017

(54) ASSOCIATING DISTINCT SECURITY MODES WITH DISTINCT WIRELESS AUTHENTICATORS

(71) Applicant: BlackBerry Limited, Waterloo (CA)

(72) Inventors: Neil Patrick Adams, Waterloo (CA); Alexander Sherkin, Woodbridge (CA); Surender Kumar, Palatine, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 31 days.

(21) Appl. No.: 13/904,698

(22) Filed: May 29, 2013

(65) Prior Publication Data
US 2014/0359750 A1   Dec. 4, 2014

(51) Int. Cl.
| | |
|---|---|
| G06F 21/35 | (2013.01) |
| G06F 21/74 | (2013.01) |
| H04W 12/06 | (2009.01) |
| H04L 29/06 | (2006.01) |
| H04W 4/04 | (2009.01) |
| H04W 4/02 | (2009.01) |
| H04L 29/08 | (2006.01) |

(52) U.S. Cl.
CPC ............... *G06F 21/35* (2013.01); *G06F 21/74* (2013.01); *H04L 63/105* (2013.01); *H04W 4/043* (2013.01); *H04W 12/06* (2013.01); H04L 67/18 (2013.01); H04W 4/02 (2013.01)

(58) Field of Classification Search
None
See application file for complete search history.

(56) References Cited

U.S. PATENT DOCUMENTS 7,400,878 B2   7/2008   Hassan et al.
8,078,990 B2   12/2011  Hassan et al.
(Continued)

FOREIGN PATENT DOCUMENTS

EP   1239630   9/2002
EP   1761093   3/2007
(Continued)

OTHER PUBLICATIONS

McManus, Christopher; "Sony's SmartTags Could Change Phone Habits"; CNET; Jan. 16, 2012; retrieved from http://news.cnet.com/8301-17938_105-57359901-1/sonys-smarttags-could-change-phone-habits/ on Apr. 16, 2013; 8 pages.
(Continued)

*Primary Examiner* — Tri Tran
(74) *Attorney, Agent, or Firm* — Fish & Richardson P.C.

(57) ABSTRACT

In some aspects, a first device detects information encoded in a wireless authenticator device based on a wireless interaction between the first device and the wireless authenticator device. The first device detects the information while securing resources on the first device according to a first security mode. Based on the detected information, the first device selects a second security mode associated with the wireless authenticator device. The first device then applies the selected second security mode. The selected second security mode is one of multiple distinct security modes. Each of the multiple distinct security modes is associated with a respective one of multiple wireless authenticator devices and defines accessibility attributes of the resources on the first device.

20 Claims, 3 Drawing Sheets

(56) References Cited

U.S. PATENT DOCUMENTS

| | | | |
|---|---|---|---|
| 8,624,725 B1* | 1/2014 | MacGregor | 340/539.13 |
| 2002/0123325 A1 | 9/2002 | Cooper | |
| 2008/0009313 A1* | 1/2008 | Ishii | 455/556.1 |
| 2008/0235144 A1 | 9/2008 | Phillips | |
| 2009/0021350 A1* | 1/2009 | Hatta | G08B 13/1418 340/10.1 |
| 2011/0105073 A1 | 5/2011 | Hassan et al. | |
| 2011/0212707 A1 | 9/2011 | Mahalal | |
| 2012/0079586 A1 | 3/2012 | Brown et al. | |
| 2012/0220216 A1 | 8/2012 | Carbonell Duque et al. | |
| 2012/0252480 A1* | 10/2012 | Krutt | H04B 5/0056 455/456.1 |
| 2012/0254031 A1 | 10/2012 | Walker et al. | |
| 2012/0329388 A1 | 12/2012 | Royston et al. | |
| 2013/0040561 A1* | 2/2013 | Conde e Silva et al. | 455/41.1 |
| 2014/0196106 A1* | 7/2014 | Zellner | 726/1 |
| 2014/0283142 A1* | 9/2014 | Shepherd | G06F 3/0482 726/30 |

FOREIGN PATENT DOCUMENTS

| | | |
|---|---|---|
| EP | 1895750 | 3/2008 |
| EP | 2364004 | 9/2011 |
| EP | 2364006 | 9/2011 |
| EP | 2378748 | 10/2011 |
| EP | 2442600 | 4/2012 |
| EP | 2469816 | 6/2012 |
| EP | 2506203 | 10/2012 |
| WO | 2013/009284 | 1/2013 |
| WO | 2013/009288 | 1/2013 |

OTHER PUBLICATIONS

NFC Forum; Frequently Asked Questions; 2013; retrieved from http://www.nfc-forum.org/resources/faqs/ on Apr. 16, 2013; 12 pages.
Radio-Electronics.com "NFC Tags and Tag Types"; retrieved from http://www.radio-electronics.com/info/wireless/nfc/near-field-communications-tags-types.php on Apr. 16, 2013; 5 pages.
Wikipedia; Near Field Communication retrieved from http://en.wikipedia.org/wiki/Near_field_communication on Apr. 16, 2013; 11 pages.
U.S. Appl. No. 13/690,001, entitled "Verifying a Wireless Device," filed Nov. 30, 2012.
NFC Forum, Signature Record Type Definition, Technical Specification—Signature 1.0, dated Nov. 18, 2010; 18 pages.
NFC Forum, NFC Activity Specification, Technical Specification—Activity 1.0, dated Nov. 18, 2010; 117 pages.
NFC Forum, Connection Handover, Technical Specification—Connection Handover 1.2, dated Jul. 7, 2010; 27 pages.
JustAskGemalto.com; Personal Data Tips; "How Can NFC Be Used for IT Access and Identity Applications?" retreived from http://www.justaskgemalto.com/us/personal-data/tips/how-can-nfc-be-used-it-access-and-identity-applications on May 6, 2013; 2 pages.
Extended European Search Report issued in European Application No. 14170206.8 on Aug. 20, 2014.

\* cited by examiner

ASSOCIATING DISTINCT SECURITY MODES WITH DISTINCT WIRELESS AUTHENTICATORS

BACKGROUND

This specification relates to associating distinct security modes with distinct wireless authenticators.

Some wireless devices use passwords for user authentication. The device can be locked, for example, by the user or based on inactivity for a certain period of time. When the device is locked, the password is used to authenticate a user's identity and grant access accordingly. For example, the wireless device can be unlocked when a correct password is provided, and it can remain locked otherwise.

BRIEF DESCRIPTION OF THE DRAWINGS

Like reference numbers and designations in the various drawings indicate like elements.

DETAILED DESCRIPTION

A device can perform authentication before allowing a user or an external system to access certain resources on the device. In some implementations, the device can use multiple wireless authenticator devices (e.g., Near Field Communication (NFC) tags, articles attached with a Quick Response (QR) code, or another appropriate device) for authentication. The multiple wireless authenticator devices can be used as an alternative or an addition to other authentication mechanisms (e.g., a password). In some implementations, the device can receive information from one or more of the wireless authenticator devices, authenticate the information, and determine whether to lock or unlock the device. In some implementations, in addition to locking and unlocking the device, the multiple wireless authenticator devices can be associated with multiple security modes that define multiple accessibility attributes. Based on the accessibility attributes, the device can respond differently to different wireless authenticator devices and can provide customized authentication.

For instance, during an initialization process for each wireless authenticator device, a set of properties or attributes can be associated with each wireless authenticator device. The attributes can include, for example, one or more of a timeout attribute, an authentication attribute, an resource attribute, or any other appropriate attribute.

A timeout attribute can indicate, for example, how long certain resources on the device remain accessible after unlocking such resources by a wireless authenticator device. The timeout attribute can also include an idle timeout attribute (e.g., in minutes) that indicates, for example, after unlocking the device using a particular wireless authenticator device, how long it takes for the device to become locked again after an idle timeout.

An authentication attribute can indicate, for example, what additional authentication mechanisms are required to unlock the device other than the wireless authenticator device. For example, the additional authentication mechanism can include a personal identification number (PIN), a password or passcode, a Quick Response (QR) code, a barcode, a graphical authenticator, touch gesture or other gesture, biometric data, another authenticator device, or any combination of any of these and other authentication mechanisms.

A resource attribute can indicate, for example, a subset of resources (e.g., a perimeter, an application, a file, a network resource, etc.) that can be unlocked with a particular wireless authenticator device. For example, resource attributes can be configured such that a first wireless authenticator device (e.g., at a user's home) unlocks a user's personal perimeter, while a second wireless authenticator device (e.g., at a user's office) unlocks the user's work perimeter.

In some implementations, a whitelist or blacklist can be constructed and incorporated in the resource attribute indicating subsets of resources (e.g., applications, data, features, etc.) that are unlocked or locked by each wireless authenticator device, respectively. In some implementations, in addition to or as an alternative to unlocking resources, the wireless authenticator devices can be used to lock certain resources on the device.

In some implementations, these or other security modes and accessibility attributes can be configured depending on a location of the wireless authenticator device. For example, if the wireless authenticator device is placed at home, the timeout attribute can be set to have longer timeout duration than if the wireless authenticator device is placed in an office. If the wireless authenticator device is in a relatively secure location, the authentication attribute can be configured to require less additional authentication mechanisms, whereas if the wireless authenticator device is placed in an office at work which is open during the day, the authenticator attribute can be configured to require PIN for further authentication.

In some implementations, the security modes and associated accessibility attributes are stored on the first device (i.e., the device that secures the resources), but not on the wireless authenticator devices. An identifier can be stored on (or otherwise encoded in) each wireless authenticator device and the first device can pair or otherwise associate a particular security mode with the identifier of each specific wireless authenticator device. When the first device interacts with a particular wireless authenticator device, the wireless authenticator device's identifier can be detected and the associated security mode's accessibility attributes can be retrieved on the first device. The first device can include an authentication module that ensures that the settings (e.g., security modes and their accessibility attributes) are applied properly on the device.

In some aspects, using multiple wireless authenticator devices for authentication can improve the authentication experience across different types of environments and allow tradeoffs between convenience, usability, and security. For instance, a wireless authenticator device plus a short PIN can be more convenient than a long password, without sacrificing security. The use of multiple wireless authenticator devices can have other benefits, which may be achieved in other environments and in other contexts.

Figure 1:
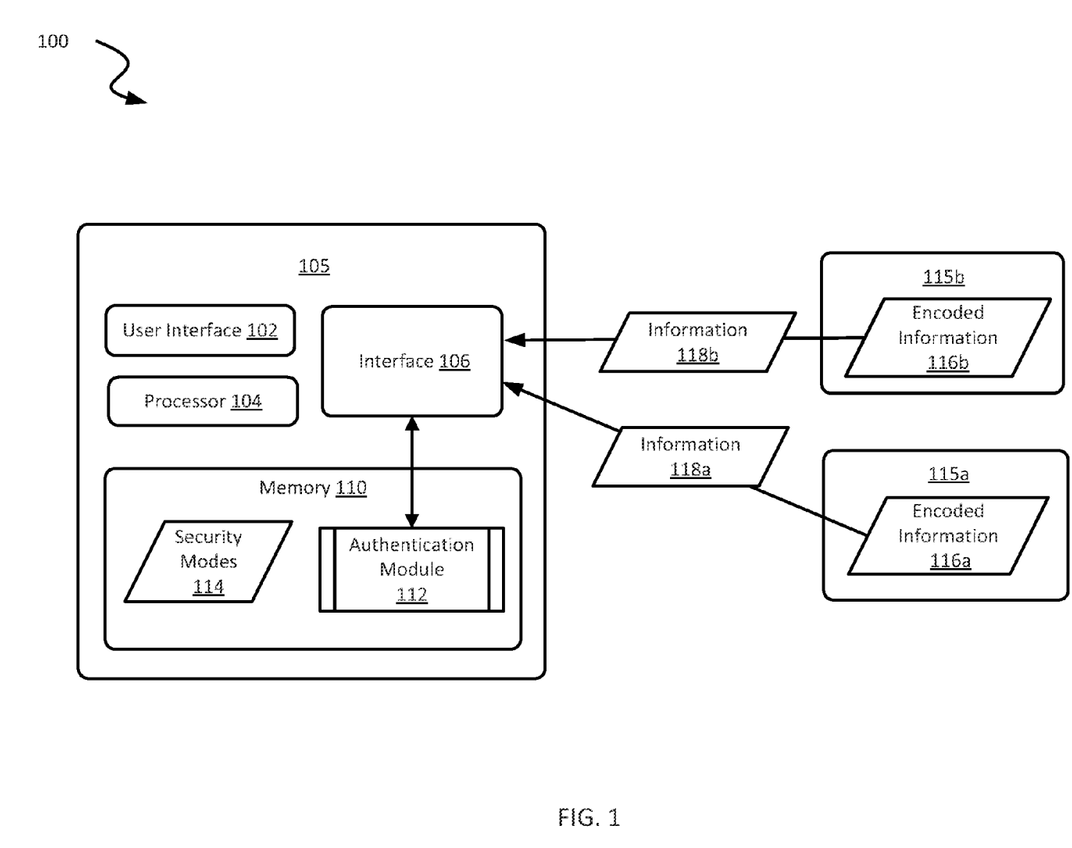
FIG. 1 is a schematic diagram of an example communication system.

FIG. 1 is a schematic diagram of an example communication system 100. The example communication system 100 includes a first device 105, and two wireless devices 115a and 115b. The communication system 100 can include additional or different features and components. For example, the communication system 100 can include one or more networks, servers, computing systems, additional or different devices or wireless devices, or any suitable combination of these and other components. The components of the communication system 100 can be configured as shown in FIG. 1, or the communication system 100 can be configured in another manner, as appropriate.

In some example implementations, the first device 105 comprises a smartphone or another type of mobile computing device, and the second and third wireless devices 115a and 115b comprise wireless authenticator devices. In some implementations, the second wireless device 115a and the third wireless device 115b can each include a Quick Response (QR) code or another type of graphic code that can be optically scanned or otherwise read by the first device 105. In some implementations, the second wireless device 115a and the third wireless device 115b each can be a proximity-activated device or another type of device that contains a proximity-based communication interface. A proximity-based communication device can include any appropriate types of subsystems, modules, devices, components, and combinations thereof.

One example of proximity-based communication is provided by Near Field Communication (NFC) technology or other RFID (Radio Frequency Identification)-based technology. In some implementations, NFC technology enables data exchange between devices at a distance of approximately four to approximately ten centimeters, at rates of approximately 100 kbps. NFC-enabled devices can be made to transfer information between devices by simply placing them near each other. For example, "tapping" or otherwise bringing two NFC-enabled devices within range of each other may cause one or both of the devices to send data to the other device.

Some NFC-enabled devices include passive components. For example, some NFC tags operate passively, utilizing power received wirelessly from an active NFC device. Accordingly, some NFC devices can operate in a listening mode or another passive mode of operation. An NFC device operating in a listening mode can receive wireless signals transmitted by other NFC devices. The listening NFC device can respond by transmitting a signal that allows the other NFC device to detect proximity of the listening NFC device. The response can be generated based on energy extracted from the signal received by the listening NFC device, energy stored at the listening NFC device, or energy from other sources.

Some NFC-enabled devices include active components. For example, some NFC devices have a power source or they can be integrated into a device (e.g., a smartphone, a tablet, etc.) having a power source. Such active devices can operate in a listening mode as outlined above. Additionally or alternatively, an active NFC device can operate in a polling mode. An NFC device operating in a polling mode can send periodic polling signals or other interrogation messages that allow other NFC devices to detect proximity of the polling NFC device. The polling NFC device can detect proximity of other NFC devices, for example, when the other NFC devices respond to the polling signal. As an example, the first device 105 includes an active NFC device while the second wireless device 115a and the third wireless device 115b each include a passive NFC tag. The second wireless device 115a and the third wireless device 115b can utilize field or power received from the first device 105 for communications.

NFC-enabled devices communicate with each other wirelessly by electromagnetic signals. For example, some currently available NFC-enabled devices utilize radio frequency signals at or near 13.56 MHz. Whether two NFC-enabled devices detect proximity of each other can be a function of the effective range of their NFC modules and other factors. In various contexts, the effective range at which NFC modules can detect each other may depend, for example, on the power and frequency of the signals transmitted, the transmission environment, the orientation of the devices, and other considerations. For example, a listening NFC device may detect proximity of a polling NFC device when the listening NFC device receives a signal having a signal-to-noise ratio greater than a threshold level. Similarly, a polling NFC device may detect proximity of another device when the polling NFC device receives a signal having a signal-to-noise ratio greater than a threshold level. Different NFC devices may have different effective ranges, and they may have different thresholds for detecting proximity of other devices. Moreover, proximity can be detected based on additional or different criteria. In some examples, NFC-enabled devices are configured to detect proximity of other NFC-enabled devices within a range of about four to ten centimeters. NFC-enabled devices can potentially be configured to detect NFC-enabled devices, or other types of devices, in a different range.

In some implementations, a device may detect proximity of another device based on additional or different techniques. For example, a device may include an accelerometer, a directional coupler, an optical detector, or a combination of any of these and other components that enhance proximity-detection features provided by NFC or another type of proximity-based wireless communication technology. In some instances, a device can detect proximity of another device based on physical contact between the devices. For example, some devices may include sensors that detect proximity of another device based on non-conductive contact, conductive contact (e.g., wires or leads), or another type of conductive or non-conductive contact with the other device.

In one specific example, the second and third wireless devices 115a and 115b comprise NFC tags, and the first device 105 is a smartphone containing an NFC reader. The smartphone can communicate with each of the NFC tags using the NFC reader. In some aspects, the smartphone, as an NFC reader, can detect proximity of the NFC tags and receive information from the NFC tags. Based on the information received from the NFC tags, the smartphone can perform authentication to determine whether to allow, for example, a user of the smartphone to access certain resources on the smartphone.

Generally, the first device 105 can be any device that includes a wireless communication interface. The first device 105 can include any appropriate types of subsystems, modules, devices, components, and combinations thereof. Examples of devices include various types of mobile telecommunication devices, smartphones, smartcards, identification devices, media players, headsets, personal digital assistants (PDAs), laptops, notebooks, tablets, computing devices, etc. The example communication system 100 can include additional or different types of devices, as appropriate.

The example first device 105 shown in FIG. 1 includes a user interface 102, a processor 104, an interface 106, a memory 110, and an authentication module 112. The first device 105 can include additional or different features or components. The features and components of the first device 105 can be configured as shown and described with respect to FIG. 1, or the features and components of the first device 105 can be configured in a different manner.

The example user interface 102 of the first device 105 can include any suitable user interface devices or components. For example, the user interface 102 can include a display, a touchscreen, a keyboard, a microphone, a pointing device (e.g., a mouse, a trackpad, a trackball, a stylus, etc.), or another type of user interface. The user interface 102 can detect a user interaction and generate computer-readable data or signals based on the user interaction. In some aspects, the user's interaction with the user interface can include, for example, keystrokes, voice, gestures, etc., which can serve as a PIN, a password, or another type of authentication mechanism for determining whether to allow access to certain resources on the first device 105.

The example processor 104 of the first device 105 can include any suitable data processing apparatus. For example, one or more aspects of a processor may be implemented by a microprocessor, a digital microcontroller, digital or analog circuitry, or a combination of these and other types of data processing hardware, firmware, or software. In some implementations, the processor 104 includes a general purpose processor, a main processor, a co-processor, and a combination of multiple data processing devices. In some instances, one or more components of a processor can be integrated or otherwise associated with another component of a wireless device or computing system.

In some implementations, a processor can execute instructions, for example, to generate output data based on data inputs. The instructions can include programs, codes, scripts or other types of data stored in memory. Additionally or alternatively, the instructions can be encoded as pre-programmed or re-programmable logic circuits, logic gates, or other types of hardware or firmware components. In some instances, a processor can generate output data by executing or interpreting software, scripts, programs, functions, executables, or other modules stored in memories. The processor may perform one or more of the operations shown in FIG. 3.

The example interface 106 of the first device 105 can include any suitable communication or interaction interface. The interface 106 can be used by the first device 105 for direct, wireless interactions with the second wireless device 115a, the third wireless device 115b, or other devices or systems. In some implementations, the interface 106 can interact with other components within the first device 105. In some instances, one or more aspects of the interface 106 are implemented by logic encoded in software, hardware, or both in a suitable combination and operable to support one or more protocols associated with the interaction or communications with one or more appropriate components, devices or systems.

In some instances, first device 105 includes one or more additional communication interfaces. As a specific example, in some implementations the first device 105 can communicate with another device or system indirectly over a data network or a telecommunications network (e.g., an ad-hoc network, a WiFi network, a local area network, a GSM/GPRS network, a LTE/LTE-Advanced network, etc.). In some implementations, the first device 105 can communicate with another device or system through a wire line interface such as a fiber optical communication interface, a power line communications interface, a USB interface, or other possible interfaces.

In some implementations, the interface 106 comprises a proximity-activated wireless interface, for example, NFC interface, Bluetooth interface, or any additional or different types of proximity-activated wireless interfaces. In some instances, the conditions under which the interface 106 detects proximity of the second or third wireless device 115a, 115b may depend on settings or attributes of the particular wireless device. For example, the interface 106 may detect proximity based on receiving signals having a signal-to-noise ratio greater than a threshold level. Moreover, the conditions under which proximity can be detected may depend on the physical orientations of the wireless devices, physical attributes of their environment, and other considerations.

In some implementations, the example interface 106 can include a recognition or detection module or apparatus, for example, a camera, a scanner, a code reader, or any other appropriate component or device. The recognition or detection module can receive or capture information (e.g., an image, a barcode, a QR code, a text, or any other appropriate type of information) from another device (e.g., the second wireless device 115a or the third wireless device 115b). As an example, the interface 106 can include a QR reader that can detect and scan a QR code associated with the second wireless device 115a or the third wireless device 115b. In some implementations, the QR reader may further decode information encoded in the QR code and pass the decoded information to other components (e.g., the authentication module 112, the user interface 102, etc.) of the first device 105 for further operations.

Additional or different components can be included in the interface 106 of the first device for communication or interaction with the second wireless device 115a, the third wireless device 115b, or any other appropriate components, devices, or systems in the communication system 100.

The interface 106 of the first device 105 can obtain information 118a from the second wireless device 115a and information 118b from the third wireless device 115b, respectively. In some instances, the information 118a is wirelessly transmitted from the second wireless device 115a to the first device 105 in response to a polling signal from the first device 105, or based on additional or different criteria. In some instances, the information 118a is included in a picture, a photograph, a scan, a radio frequency signal, or any other media and obtained by the interface 106 from the second wireless device 115a.

The example information 118a and 118b can include any type of information appropriate for reception by the interface 106 of the first device 105. For example, the information 118a can contain all or part of the encoded information 116a of the second wireless device 115a, while the information 118b can contain all or part of the encoded information 116a of the third wireless device 115b. The information 118a and 118b can include additional control information or instruction. For example, the information 118a and 118b may contain an identifier of the wireless device (115a, 115b) that sends the information, routing information, an instruction on how to interpret or handle the respective all or part of the encoded information 116a and 116b (e.g., decoding the information based on a certain rule or algorithm, displaying certain information in the user interface 102 of the first device 105, etc.), or a combination of these and other types of information. In some instances, the information 118a and 118b does not necessarily include the respective encoded information 116a and 116b. For example, the information 118 may serve as a cue or an instruction for an action that can be performed by the first device 105.

In some implementations, the information 118a and 118b can include information related to a respective security mode associated with the second wireless device 115a and the third wireless device 115b, respectively. For example, the information 118a and 118b may contain one or more of an identifier (e.g., an identifier of a security mode, an identifier of the second wireless device 115a or the third wireless device 115b, etc.), a security parameter that defines an accessibility attribute of the resources on the first device 105, or any additional or different types of information.

In some implementations, the information 118a, 118b may be encrypted before communicated to the first device 105. The encryption can provide confidentiality in the data communications between the first device 105 and the second wireless device 115a or the third wireless device 115b.

The example memory 110 shown in FIG. 1 can include any suitable computer-readable media. For example, a memory can include a volatile memory device, a non-volatile memory device, or both. A memory can include one or more read-only memory devices, random-access memory devices, buffer memory devices, or a combination of these and other types of memory devices. In some instances, one or more components of the memory can be integrated or otherwise associated with another component of the wireless devices or the computing system.

In some implementations, a memory can store instructions (e.g., computer code) associated with an operating system, computer applications, or other resources. A memory may store application data and data objects that can be interpreted by one or more applications or virtual machines running on the wireless device or the computing system. In the example shown in FIG. 1, the example memory 110 of the first device 105 includes an authentication module 112 and security modes 114. The memory 110 can include additional or different types of module and data, as appropriate.

The example authentication module 112 shown in FIG. 1 can include any module with authentication capability. The authentication module 112 can be implemented by digital or analog circuitry with appropriate memory, processor, software, hardware, firmware or a combination of these and other types of apparatus. For example, in some cases, all or part of the authentication module 112 can be implemented as a software program executed by a microprocessor. In some instances, the authentication module 112 is integrated with or utilizes other software or hardware resources of the first device 105, or the authentication module 112 can be a standalone module. In some implementations, some or all operations of the authentication module 112 can be executed by the processor 104, by the interface 106, or by any suitable combination of these and other components of the wireless device.

In some implementations, the authentication module 112 can execute any appropriate authentication algorithm for determining whether to allow a user to access to certain resources on the first device 105. For instance, the authentication module 112 can utilize one or more of information (e.g., information 118a or 118b) obtained from another wireless device, user input from the user interface 102, or any other appropriate information for authentication. As an example, the authentication module 112 may decode, map, identify, or otherwise determine a security mode based on the information 118a. If a matched security mode is found, for example, in security modes 114 stored on the first device, the authentication module 112 can identify one or more accessibility attributes associated with the security mode and grant or decline external accesses of certain resources on the first device 105 according to the accessibility attributes. If no matched security mode is found, the authentication module 112 may determine that authentication is failed and decline external access to the first device 105 or perform any other appropriate operations.

In some implementations, the authentication module 112 can perform additional operations based on the obtained information from another wireless device, the user input, or a combination of these and other types of information. For example, the authentication module 112 may interact with other components or modules (e.g., the processor 104, the user interface 102, etc.) of the first device 105 for processing. For example, the authentication module 112 may interact with the user interface 102, for example, for requesting and receiving user input (e.g., password, PIN, etc.). The received user input can be combined with and the information obtained from the wireless device (e.g., the wireless device 115a or 115b) for further authentication. Additional or different processing and operations can be configured for the authentication module 112.

The security modes 114 can comprise, for example, a database that includes a list of security modes, accessibility attributes or security properties of the security modes, or additional or different information as appropriate. In some aspects, a security mode can define accessibility attributes of resources on the first device 105. Based on a particular security mode, the first device can grant or decline external access to certain resources on the first device 105 according to the accessibility attributes. In some implementations, a security mode can include multiple security parameters that define accessibility attributes of the resources on the first device 105. For example, the accessibility attributes can include one or more of a timeout attribute, an authentication attribute, a resource attribute, or any additional or different types of attribute.

The timeout attribute, for instance, can indicate a time duration for which a security mode remains active. For example, the timeout attribute can indicate the time duration for which certain resources on the first device 105 are accessible externally and the resources become inaccessible after elapse of the time duration. As a specific example, the security modes may include a game security mode that includes a timeout attribute with a particular value, for example, one hour. The timeout attribute may indicate that certain games or game applications on the first device 105 (e.g., a smartphone or a tablet) are accessible for one hour once the game security mode is activated and the games or game applications become inaccessible after one hour. The timeout attribute may indicate the time duration for which certain resources on the first device 105 are inaccessible externally and the resources may become accessible after elapse of the time duration. In another example, the timeout attribute may indicate that certain games or game applications on the first device 105 are accessible up to a particular expiration date or time. In another example, the timeout attribute may indicate that certain games or game applications on the first device 105 are accessible during particular time periods, for example, from 7:00 PM to 9:00 PM on weekdays and from 9:00 AM to 10:00 PM on weekends. In another example, the timeout attribute may indicate that certain games or game applications on the first device 105 are inaccessible during particular time periods, for example, from 8:00 AM to 5:00 PM on weekdays. Other appropriate definitions of the timeout attribute can also be configured.

In some implementations, the timeout attribute includes an idle timeout attribute that can indicate a maximum time duration for which a security mode remains active when the first device 105 is at idle. In some implementations, the idle timeout attribute can be configured to be in seconds, minutes, or any other unit as appropriate.

The authentication attribute, for instance, can indicate an authentication mechanism that is required before allowing certain resources to be accessed external to the first device 105. For example, the authentication mechanism includes one or more of the following, including any combination of any of the following: a personal identification number (PIN), a password or passcode, a QR code, a barcode, a graphical authenticator, touch gesture or other gesture, biometric data, another authenticator device, or any other type of authentication technique. A touch gesture, for example, may include one or more touch events, such as swipes, taps or other touch inputs, detectable by a touch-sensitive device such as a touchscreen or touchpad. Other gestures may include various motions detectable by gesture recognition techniques. Graphical authenticators may include one or more touch gestures, images or other graphical objects used for authentication. Biometric data may include without limitation fingerprint or palmprint data, facial characteristics, iris or retina characteristics, voice, heart rate, typing characteristics, gait, signature, etc. In some instances, the indicated authentication mechanism can be used in addition to the authenticator device (e.g., the second wireless device 115a or the third wireless device 115b) before allowing the resources to be accessed external to the first device 105. In some cases, the authentication attribute can indicate that no additional authentication mechanism is required.

The authentication attributes can be configured, for example, based on a security level of a location, an authority level of a user, or any other appropriate criterion. For instance, in a more secure location (e.g., home), less or easier authentication mechanisms may be required and the authentication attribute may indicate no additional authentication mechanism or only a short PIN is required. In a less secure location (e.g., an open work place), more than one or more complex authentication mechanisms may be required and the authentication attribute may indicate that a long password is required in addition to the authenticator device. Security of a location may vary depending on the circumstances, and in other embodiments, a work location may be considered relatively more secure than a home location.

The resource attribute, for instance, can indicate a subset of resources on the first device 105 that are accessible externally when the first device is in a certain security mode. The resource attribute may indicate a subset of the resources on the first device 105 that are inaccessible externally when the first device is in a certain security mode. In some implementations, a whitelist or a blacklist can be created based on the subsets of the resources that are permitted or prohibited in a security mode, respectively. In some implementations, the subset can include one of a perimeter, an application, a file, a network resource, a feature, or any other appropriate resource.

Perimeters can be implemented as groups of resources having a common management scheme, wherein each perimeter generally includes one or more resources and one or more policies regarding use of or access to the one or more resources. Perimeters may be implemented on data communication systems that include a device, and can be used to logically separate information (e.g., files, applications, certificates, configuration data, network connections, data, and the like) on the device. For example, the device can implement two or more perimeters, which can include a personal perimeter, an enterprise or work perimeter, or any suitable combination of these and other types of perimeters. In some implementations, the device may include multiple personal perimeters, multiple enterprise perimeters, or both. A personal perimeter can be managed by a device user, and an enterprise perimeter can be managed by an enterprise or corporate administrator. In some implementations, the enterprise or corporate administrator can additionally manage the personal perimeter or the device or both. A device purchased, owned, or otherwise provided by an enterprise, employer or corporation may generally be referred to as a corporate-liable device, while a device purchased, owned or otherwise provided by an employee or individual may generally be referred to as a personal-liable device or an individual-liable device.

In some implementations, each perimeter on a device (e.g., enterprise or personal) has its own file system on the device, and separation between perimeters can be provided, at least partially, by the separation of the file systems on the device. In some cases, some of the resources of each perimeter (e.g., data and policies) are stored in a dedicated file system for the perimeter, while other resources of each perimeter (e.g., applications) are stored outside of the dedicated file system.

Separation of file systems can be logical, physical, or both. A physical separation of file systems can be implemented, for example, by designating physically separate memory locations (e.g., separate memory devices or separate blocks in the same memory) for each file system. A logical separation of file systems can be implemented, for example, by designating logically separate data structures (e.g., separate directories, etc.) for each file system. In some implementations, each file system has its own encryption parameters. For example, the file system for a corporate perimeter can have its own encryption key and higher encryption strength, while a file system for a personal perimeter can have its own encryption key and lower encryption strength. In some instances, the file system for the personal perimeter has the same encryption strength as the corporate perimeter, or the file system for the personal perimeter can be unencrypted.

As described above, a perimeter can include a group of resources that share a common management scheme governing the use of resources in the group and can encompass both the resources and the management policies that describe how the resources may be used. The management policies can include security restrictions, which can be defined for the perimeter. Applications executable by the device can include resources that, when executed, request access to other resources or provide resources to other applications (or both). For an application that is assigned to or associated with a perimeter, resources included in the application can be included in the group of resources included in the perimeter. Further, security restrictions defined for the perimeter can restrict the application to resources included in the group. Thus, when the application is executed within the perimeter, security restrictions included in the management policies of the perimeter can determine whether or not the resources associated with the application can access other resources, such as resources included in the group or resources outside the group (or both), or grant access to other applications, such as applications assigned to or associated with or not assigned to or associated with the perimeter (or both).

When a resource (e.g., an application) is "launched into" a perimeter, an instance of the application is instantiated in the perimeter. The management policy of the perimeter where an application is launched can determine, at least partially, what resources (e.g., data resources, network resources, etc.) the application can access or execute. As such, when an instance of an application is running in a perimeter, permissions for the instance of the application are determined based at least partially on the management policy of the perimeter. For some applications, access to resources outside a perimeter can be determined, at least partially, based on the policies of the other perimeter.

In some implementations, a secure perimeter can divide or segregate different categories of data (e.g., work data, personal data, etc.) from the operating system level all the way to the user interface. As such, the perimeter architecture can provide protection of data at the operating system level, the file level, the user interface level, and other levels of the device. A secure perimeter can, in some cases, ensure a complete separation between the different categories of data, applications and the user experience, while at the same time also allowing the different categories of data to co-exist in the same application and share data when desired. A secure perimeter can allow for "hybrid apps," such as, for example, a unified inbox showing both personal and corporate email. In some instances, applications can be limited to an individual perimeter view (e.g., a "work" or "personal" perimeter view). For example, a social networking application can be configured to appear only in the personal perimeter. In some instances, separate instances of the same application can run in multiple perimeters. For example, a device can have an instance of a social networking application (e.g., Facebook, Twitter, etc.) running in a personal perimeter for a user's personal account, and the device can have an instance of the same social networking application running in a corporate perimeter for the user's company or the user's corporate account.

As an example, the security modes 114 can include a home security mode and a work security mode. The two security modes can each define and include a personal perimeter attribute and a work perimeter attribute. For example, in the home security mode, the personal perimeter attribute may indicate that the resources defined in the personal perimeter are accessible while the work perimeter attribute may indicate that the resources defined in the work perimeter are inaccessible. In the work security mode, the personal perimeter attribute may indicate that the resources defined in the personal perimeter are inaccessible while the work perimeter attribute may indicate that the resources defined in the work perimeter are accessible.

In some implementations, the security modes 114 can be pre-loaded in the first device 105, for example, during initialization. The security modes 114 may be updated or modified, for example, periodically or at specified times. In some instances, new security modes may be added to the list of modes. In some implementations, each of the security modes is paired or otherwise associated with a respective authenticator device (e.g., the second wireless device 115a or the third wireless device 115b). The authenticator device may store all or part of the information related to the respective security mode. In some implementations, the authenticator device may only store a simple identifier of the respective security mode and the identifier can be used to retrieve the corresponding accessibility attributes of the particular security mode by the first device 105 where the multiple security modes as well as their respective attributes are stored.

The example second wireless device 115a and the example third wireless device 115b shown in FIG. 1 include encoded information 116a and encoded information 116b, respectively. The example second wireless device 115a and third wireless device 115b may include additional or different components, for example, a processor, a memory, an interface, or any other appropriate module or apparatus. In some instances, the second wireless device 115a and the third wireless device 115b each may include a single digital or analog circuitry with appropriate memory, processor, interface, software, hardware, firmware or a combination of these and other types of apparatus. The second wireless device 115a and the third wireless device 115b can have identical, similar, or different structures or configurations.

In some implementations, the encoded information 116a and 116b can include information that is pre-loaded in the second wireless device 115a and third wireless device 116b, respectively. The encoded information 116a and 116b may include information that can be updated or modified from time to time. The encoded information 116a and 116b may include one or more of an identifier, a link, a status report, an instruction, content such as text data, image data, audio data, multimedia data, or a combination of any of these and other types of information. The identifier may include information that identifies one or more of a security mode (e.g., a security mode of the first device 105), device (e.g., the second wireless device 115a or the third wireless device 115b), location, address, component, and user of a device, or any attribute of the device, security mode, location, address, component, and user of the device. The link can be a link to content accessible by the Internet, a link to content accessible on a local area network, a link to content stored on a device (e.g., device 105, 115a, or 115b) or another type of link. In some instances, the link can be in the form of a uniform resource locator (URL). The status report can be, for example, a power level of the second wireless device 115a or the third wireless device 115b, an indication whether the second wireless device 115a or the third wireless device 115b is functioning normally, or any other indication of any specific function of second wireless device 115a or the third wireless device 115b.

In some instances, the second wireless device 115a, the third wireless device 115b or both can comprise NFC tags. For example, the second wireless device 115a or third wireless device 115b can comprise a passive NFC tag, an active NFC tag, or any other appropriate NFC tag. As a specific example, the second wireless device 115a comprises an NFC tag that has a unique identifier, while the third wireless device 115b comprises another NFC tag that stores another unique identifier. In one embodiment, the second wireless device 115a detects proximity of the first device 105 based on an interaction between the device 105 and the third wireless device 115b. In response to detecting proximity of the first device 105, the second wireless device 115a can send the information 118a to the first device 105. In some instances, the information 118a includes the identifier. The first device 105 may process the information 118a and pass the information 118a to the authentication module 112. The authentication module 112 can select a particular security mode based on the identifier. For example, the identifier may have previously been associated with a first security mode, and upon receiving the identifier, the authentication module can select the first security mode and its associated accessibility attributes. The first device 105 can then apply the first security mode based on the identified accessibility attributes associated with the first security mode. Additional or different operations can be performed before, during, or after the interactions between the first device 105 and the second wireless device 115a.

In some instances, the second wireless device 115a, the third wireless device 115b, or both can be devices or articles attached with QR codes. For example, each of the QR codes can encode information that can be associated to a distinct security mode on the first device 105. In one aspect of operation, upon detecting the QR code associated with the second wireless device 115a or the third wireless device 115b by the interface 106, the authentication module 112 may identify corresponding security mode information based on the QR codes, and apply the corresponding decoded security mode on the first device 105. Additional or different operations can be performed before, during, or after the interactions between the first device 105 and the second wireless device 115a or the third wireless device 115b.

The second wireless device 115a or the third wireless device 115b can comprise any other type of appropriate devices or articles (e.g., a fob, a card, a key, a token, etc.) with encoded authentication information (e.g., a barcode, an identifier, or any other type of machine-readable representation of data). The first device 105 can include an appropriate interface (e.g., the interface 106) facilitating interactions and communications between the first device 105 and the second wireless device 115a or the third wireless device 115b.

Figure 2:
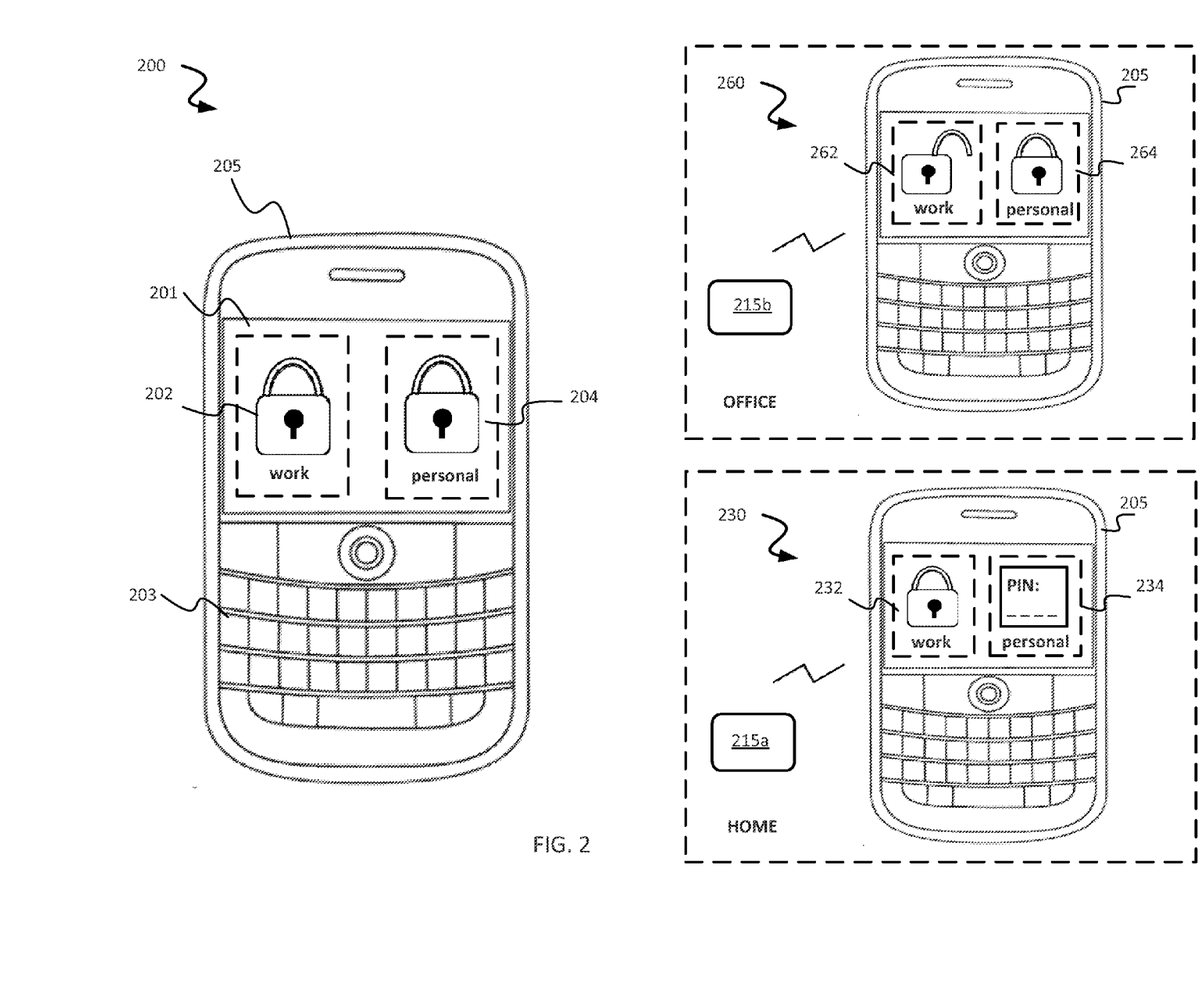
FIG. 2 is a schematic diagram of security modes in an example communication system.

FIG. 2 is a schematic diagram of example communication systems 200. The example communication system 200 includes a mobile telecommunication device 205 and two authenticator tags 215a and 215b. The mobile telecommunication device 205 can comprise, for example, a BLACK-BERRY® telecommunication device or another type of mobile telecommunication device. In some implementations, the mobile telecommunication device 205 comprises a dual-mode device. The two authenticator tags 215a or 215b can be wireless authenticator devices. For example, one or both of the two authenticator tags 215a or 215b can comprise an NFC tag, an article with a QR code, or another device.

In some aspects, the communication system 200 of FIG. 2 can represent an example implementation of the communication system 100 of FIG. 1. In the example shown in FIG. 2, the mobile telecommunication device 205 can be configured to operate as the first device 105 of FIG. 1 and the two authenticator tags 215a and 215b can be configured to operate as the second and third wireless devices 115a and 115b of FIG. 1. The communication system 200 can include additional or different features not shown in FIG. 2. For example, the communication system 200 can include additional wireless devices, data network (e.g., an ad-hoc network, a WiFi network, a local area network, etc.) that allows the mobile telecommunication device 205 to communicate with other devices or systems.

In some example implementations, the mobile telecommunication device 205 and the authenticator tags 215a and 215b comprise NFC-enabled devices. In some implementations, the authenticator tags 215a and 215b each are attached with a respective QR code, and the mobile telecommunication device 205 can include a QR reader interface that can detect and decode the information encoded in the QR codes of the authenticator tags 215a and 215b. Additional or different types of devices can be used for the mobile telecommunication device 205 and the authenticator tags 215a and 215b and appropriate interfaces can be included for facilitating interactions and communications between the mobile telecommunication device 205 and the authenticator tags 215a and 215b.

The mobile telecommunication device 205 includes, among other things, user interfaces, for example, a screen 201 and an optional keyboard 203, to provide for interactions with a user. A work perimeter 202 and a personal perimeter 204, or any other appropriate perimeter or resource subset, can be defined for the mobile telecommunication device 205. Multiple security modes (e.g., a home security mode, a work security mode) can be defined for the mobile telecommunication device 205. Each of the security modes may include one or more accessibility attributes, for example, a work perimeter attribute, a personal perimeter attribute, or any other appropriate attribute.

In a first example security mode, both the work perimeter 202 and personal perimeter 204 are shown as locked in FIG. 2. As such, in the first example security mode, a user of the mobile telecommunication device 205 cannot access the resources (e.g., files, applications, data, network resources, etc.) defined in the work perimeter 202 and the resources defined in the personal perimeter 204. In some instances, the first example security mode is an initial or default security mode of the mobile telecommunication device 205. The mobile telecommunication device 205 may switch to another security mode, for example, upon receiving user authentication information from the user interface (e.g., the screen 201, the keyboard 203), detecting another security mode from an authenticator device, or any other appropriate criterion.

In some instances, for example, when the mobile telecommunication device 205 is brought in proximity of the authenticator tag 215a, the mobile telecommunication device 205 may switch to a second security mode upon detection of the authentication information encoded in the authenticator tag 215a. The authenticator tag 215a may be located at a home location 230 and encode an identifier associated with a home security mode. The example second security mode (home security mode) can define a work perimeter attribute, a personal perimeter attribute, an authentication attribute, or any other appropriate attribute. These attributes indicate that, in the example home security mode shown in FIG. 2, the work perimeter 232 is inaccessible (or locked) while the personal perimeter 234 requires a PIN for additional authentication. The mobile telecommunication device 205 may need to verify receipt of a correct PIN before allowing the user to access the personal perimeter 234.

In some instances, for example, when the mobile telecommunication device 205 is brought in proximity of the authenticator tag 215b, the mobile telecommunication device 205 may switch to a third security mode upon detection of the authentication information encoded in the authenticator tag 215b. The authenticator tag 215b can be located in an office location 260 and encode an identifier associated with a work security mode. The accessibility attributes defined in third security mode (work security mode) indicate that, in the example work security mode shown in FIG. 2, the work perimeter 262 is accessible (unlocked), while the personal perimeter 264 is inaccessible (locked).

Figure 3:
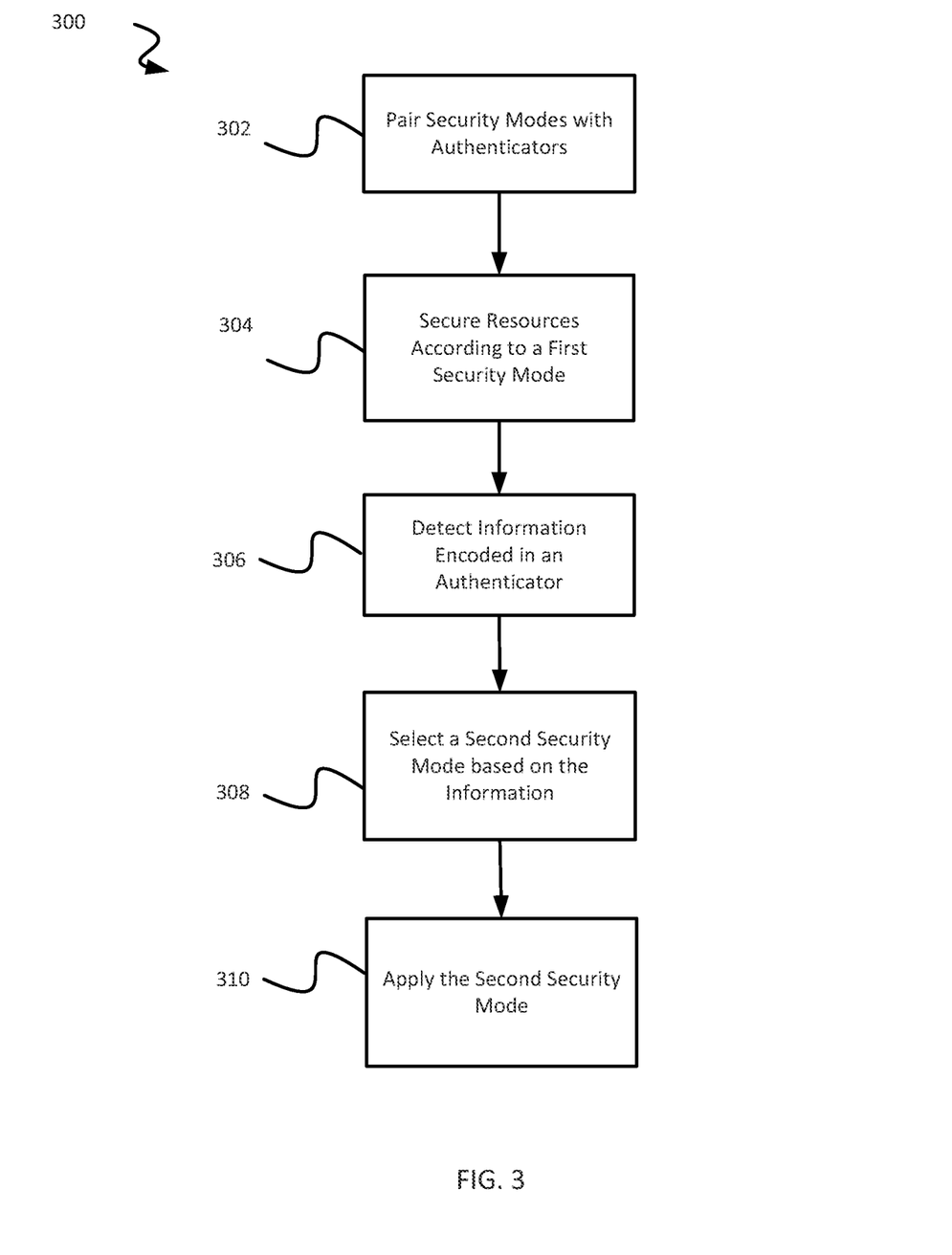
FIG. 3 is a flow diagram showing an example technique for providing authenticated access on a device.

FIG. 3 is a flow diagram showing an example process 300 for communication among devices. The process 300 can be implemented in a communication system. For example, the process 300 can be implemented by one or more components of the communication system 100 or 200 shown in FIG. 1 and FIG. 2, respectively, or by a different type of system. The example process 300 shown in FIG. 3 can be modified or reconfigured to include additional, fewer, or different operations, which can be performed in the order shown or in a different order. In some instances, one or more of the operations can be repeated or iterated, for example, until a terminating condition is reached. In some implementations, one or more of the individual operations shown in FIG. 3 can be executed as multiple separate operations, or one or more subsets of the operations shown in FIG. 3 can be combined and executed as a single operation.

At 302, each of multiple security modes of a first device is associated with a respective wireless authenticator device. For example, the first device can comprise the first device 105 in FIG. 1, the mobile telecommunication device 205 in FIG. 2, or another device. The wireless authenticator device can comprise one or more of the wireless devices 115a, 115b in FIG. 1, the authenticator tags 215a, 215b in FIG. 2, or another device. In some implementations, the first device 105 can comprise a mobile telecommunication device, a laptop computer, a speakerphone device, a tablet device, a headset device, or another type of device. In some implementations, one or more of the wireless authenticator devices can comprise an NFC tag, an article or device with a QR code, a barcode, or other information.

In some implementations, multiple security modes of the first device may be paired or otherwise associated with the respective wireless authenticator device. The associating can be made based on, for example, a location of the respective wireless authenticator device, a type of user to whom the respective wireless authenticator device is assigned, or any other appropriate criterion. For instance, the multiple security modes may include a game security mode, a child security mode, a home security mode, a work security mode, or another security mode. A wireless authenticator assigned to a child can be associated with a child security mode, where the child can only access certain resources (e.g., content, applications, data, etc.) in the first device for a certain amount of time configured by the child's parent for instance. In some instances, the child security mode can include a game security mode that defines accessibility attributes of certain game applications in the first device. In another example, a wireless authenticator device placed at office may be associated with a work security mode and a wireless authenticator device placed near a couch at home may be associated with a home security mode. Additional or different criteria or arrangements can be configured to associate a security mode with a wireless authenticator device.

In some implementations, multiple security modes of the first device may be associated with the respective wireless authenticator device during an initialization or provisioning process or when the first device is in use. Security settings (e.g., a selected security mode and accessibility attributes of the selected security mode) can be configured for the respective wireless authenticator devices. For example, the first device can store information associating each selected security mode with an identifier encoded in an NFC tag, a QR code, or other device.

In some implementations, each wireless authenticator device stores a unique identifier that is associated (e.g., at the first device) with the respective security mode. For example, the first device can store a database of the identifiers, the security mode associated with each identifier, and the accessibility attributes associated with each security mode. The identifier can be used to retrieve the corresponding security mode and accessibility attributes when the first device detects the identifier. In some implementations, the security mode paired or otherwise associated with the respective wireless authenticator device can be updated, modified, deleted, customized, or otherwise managed, for example, by a user (e.g., an administrator) of the first device through modifying the security mode database stored on the first device (e.g., the security modes 114 of the first device 105 in FIG. 1), or accessing and managing the encoded information stored on the wireless authenticator device.

At 304, the resources of the first device are secured according to a first security mode. In some implementations, the resources of the first device are secured by, for example, providing access to a subset of the resources while preventing access to other resources on the first device. In some instances, the first security mode is an initial or default security mode of the first device. In some implementations, some or all resources of the first device are not accessible external to the first device when the resources are secured according to the first security mode, and the resources are accessible external to the first device when the resources are secured according to another, different security mode.

At 306, the information encoded in one of the wireless authenticator devices can be detected, for example, by the first device. In some implementations, the first device may detect the information encoded in the wireless authenticator device by detecting proximity of the wireless authenticator device based on a wireless interaction between the first device and the wireless authenticator device. In one example, the first device can be a mobile device including an NFC interface and the wireless authenticator device is an NFC tag. In response to detecting proximity of the NFC tag, the first device can access the information encoded in the NFC tag. In another example, the wireless authenticator may be associated with a QR code that encodes authentication information of the security mode. The first device may detect the information encoded in the wireless authenticator device by detecting the QR code, for example, via a QR code reader included in the first device. Additional or different techniques can be used for detecting the information encoded in one of the wireless authenticator devices.

At 308, a second security mode is selected based on detecting the information encoded in the wireless authenticator device. In some implementations, the information encoded in the wireless authenticator device includes an identifier associated with a second security mode. Based on the identifier, the second security mode and its associated accessibility attributes can be determined, for example, by identifying a match in the security mode database on the first device. In some implementations, the information encoded in the wireless authenticator device includes one or more accessibility attributes which can be used to select the second security mode. The second security mode can be selected based on additional or different types of information detected in the information encoded in the wireless authenticator device.

In some implementations, if no matched security mode can be identified based on the encoded information in the wireless authenticator device, the authentication may be regarded as unsuccessful. The second security mode may be selected to be the same as the first security mode, or to be a more secure security mode than the first security mode. Additional or different selection and further processing can be conducted.

At 310, the second security mode is applied in the first device. For instance, the first device can apply the second security mode by securing the resources of the first device according to the accessibility attributes (e.g., a timeout attribute, an authentication attribute, a resource attribute, etc.) defined in the second security mode. For example, in the case that the second security mode includes a timeout attribute, the first device can secure the resources according to the second security mode for the time duration indicated by the timeout attribute. In the case that the second security mode includes an authentication attribute, the first device can secure the resources according to the second security mode by requesting for the authentication mechanism as indicated in the authentication attribute and verifying receipt of the authentication mechanism before allowing the resources to be accessed external to the first device. In the case that the second security mode includes a resource attribute, the first device can secure the resources according to the second security mode by providing access to the subset of the resources as indicated in the resource attribute while preventing access to other resources on the first device. The first device can perform additional or different operations for applying the second security mode.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example, a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computing device or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. A computing device typically includes a processor for performing actions in accordance with instructions and one or more memory devices for storing instructions and data. Generally, a computing device will also include, or be operatively coupled to receive data from or transfer data to, or both, one or more storage devices for storing data. However, a computing device need not have such devices.

Moreover, a computing apparatus can be embedded in a device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, subject matter described in this specification can be implemented on a device having a display, e.g., an LCD (liquid crystal display), an LED (light-emitting diodes) display, or another display for displaying information to the user and a keyboard and a pointing device, e.g., touch screen, trackball, stylus, mouse, etc., by which the user can provide input. Other kinds of devices can be used to provide for interaction with a user as well, for example, feedback provided to the user can be any form of sensory feedback, e.g., visual feedback, auditory feedback, or tactile feedback, and input from the user can be received in any form, including acoustic, speech, or tactile input.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In a general aspect, a first device can determine whether to allow a user to access certain resources on the first device. The determination can be made, for example, based on information received from a wireless authenticator device.

In some aspects, information encoded in a wireless authenticator device is detected by a first device based on a wireless interaction between the first device and the wireless authenticator device. The first device detects the information encoded in the wireless authenticator device while securing resources on the first device according to a first security mode. Based on detecting the information, the first device selects a second security mode associated with the detected wireless authenticator device. The selected second security mode is one of a plurality of distinct security modes. Each of the plurality of distinct security modes is associated with a respective one of a plurality of distinct wireless authenticator devices and defines accessibility attributes of the resources on the first device. The first device secures the resources on the first device according to the selected second security mode.

Implementations of these and other aspects can include one or more of the following features. Each of the plurality of distinct security modes is associated with the respective one of the plurality of distinct wireless authenticator device. Each of the plurality of distinct security modes is associated with the respective one of the plurality of distinct wireless authenticator devices based at least in part on a location of the respective one of the plurality of distinct wireless authenticator devices.

Additionally or alternatively, implementations of these and other aspects can include one or more of the following features. The security modes comprise one or more of a game security mode, a child security mode, a home security mode, or a work security mode. Detecting information encoded in the wireless authenticator device comprises detecting proximity of the wireless authenticator device. The wireless authenticator device may include a Near Field Communication (NFC) or other RFID-based interface or a Quick Response (QR) code.

Additionally or alternatively, implementations of these and other aspects can include one or more of the following features. The resources are not accessible external to the first device when the resources are secured according to the first security mode, and the resources are accessible external to the first device when the resources are secured according to the second security mode.

Additionally or alternatively, implementations of these and other aspects can include one or more of the following features. The second security mode includes a security parameter that defines a timeout attribute, the timeout attribute indicates a time parameter for securing the resources according to the second security mode. The resources on the first device are secured according to the second security mode and further according to the timeout attribute.

Additionally or alternatively, implementations of these and other aspects can include one or more of the following features. The second security mode includes a security parameter that defines an authentication attribute. The authentication attribute indicates an authentication mechanism that is required before allowing the resources to be accessed external to the first device. Receipt of the authentication mechanism is verified before allowing the resources to be accessed external to the first device. The authentication mechanism includes a personal identification number (PIN), a password or passcode, a Quick Response (QR) code, a barcode, a graphical authenticator, touch gesture or other gesture, biometric data, another authenticator device, or any combination of these.

Additionally or alternatively, implementations of these and other aspects can include one or more of the following features. The second security mode includes a resource attribute that defines a subset of the resources that are accessible external to the first device when the resources are secured according to the second security mode, and the method comprises providing access to the subset of the resources while preventing access to other resources on the first device. The subset includes at least one of a perimeter, an application, a file, or a network resource.

Thus, particular implementations of the subject matter have been described. Other implementations are within the scope of the following claims. In some cases, the actions recited in the claims can be performed in a different order and still achieve desirable results.

What is claimed is:

1. An authentication method comprising:
   securing resources on a first device according to a first security mode, wherein the resources on the first device are grouped into a plurality of subsets of resources, each of the plurality of the subsets of resources includes a plurality of resources having a common management scheme, and the first security mode is one of a plurality of distinct security modes;
   while securing resources on the first device according to the first security mode, detecting, at the first device, information encoded in a wireless authenticator device based on a wireless interaction between the first device and the wireless authenticator device, wherein the information includes one or more accessibility attributes and the one or more accessibility attributes includes a resource attribute and an authentication attribute, the resource attribute indicating whether external access to a plurality of resources having a common management scheme is granted or declined, the authentication attribute indicating an additional authentication mechanism that is required before allowing external access to the plurality of resources, and the additional authentication mechanism being independent of using the wireless authenticator device;
   based on the one or more accessibility attributes, selecting a second security mode associated with the wireless authenticator device, wherein the second security mode is different than the first security mode; and
   applying the selected second security mode at the first device, wherein applying the selected second security mode comprising securing the plurality of resource having the common management scheme according to the resource attribute.

2. The authentication method of claim 1, further comprising associating each of the plurality of distinct security modes with the respective one of the plurality of distinct wireless authenticator devices.

3. The authentication method of claim 2, wherein associating each of the plurality of distinct security modes with the respective one of the plurality of distinct wireless authenticator devices is based at least in part on a location of the respective one of the plurality of distinct wireless authenticator devices.

4. The authentication method of claim 1, wherein the security modes comprise one or more of a game security mode, a child security mode, a home security mode, or a work security mode.

5. The authentication method of claim 1, wherein external access to the resources is declined when the resources are secured according to the first security mode, and external access to the resources is granted after applying the selected second security mode.

6. The authentication method of claim 1, wherein the second security mode defines a timeout attribute, the timeout attribute indicates a time parameter for securing the resources according to the second security mode, the time parameter specifying a beginning and ending time for securing the resources, and the method further comprises securing the resources on the first device according to the second security mode and further according to the timeout attribute.

7. The authentication method of claim 1, further comprising verifying receipt of the additional authentication mechanism before allowing external access to the resources.

8. The authentication method of claim 7, wherein the additional authentication mechanism includes one or more of a personal identification number (PIN), a password, a Quick Response (QR) code, a barcode, a graphical authenticator, a gesture, biometric data, or another authenticator device.

9. The authentication method of claim 1, wherein detecting information encoded in the wireless authenticator device comprises detecting proximity of the wireless authenticator device.

10. The authentication method of claim 1, wherein the external access includes at least one of user access or access by a system external to the first device.

11. A device comprising:
    a communication interface operable to detect information encoded in a wireless authenticator device based on a wireless interaction between the communication interface and the wireless authenticator device; and
    one or more data processing apparatus operable to:
    secure resources on the device according to a first security mode, wherein the resources on the device are grouped into a plurality of subsets of resources, each of the plurality of the subsets of resources includes a plurality of resources having a common management scheme, and the first security mode is one of a plurality of distinct security modes;

receive the detected information from the communication interface while securing resources of the device according to the first security mode, wherein the detected information includes one or more accessibility attributes and the one or more accessibility attributes include a resource attribute and an authentication attribute, the resource attribute indicating whether external access to a plurality of resources having a common management scheme is granted or declined, the authentication attribute indicating an additional authentication mechanism that is required before allowing external access to the plurality of resources, and the additional authentication mechanism being independent of using the wireless authenticator device;

based on the one or more accessibility attributes, select a second security mode associated with the wireless authenticator device, wherein the second security mode is different than the first security mode; and apply the selected second security mode, wherein applying the selected second security mode comprising securing the plurality of resources having the common management scheme according to the resource attribute.

12. The device of claim 11, wherein the communication interface includes a Near Field Communication (NFC) interface and the one or more accessibility attributes are received over a NFC interface.

13. The device of claim 11, wherein the communication interface includes a Quick Response (QR) code reader.

14. The device of claim 11, wherein external access to the resources is declined when the resources are secured according to the first security mode, and external access to the resources is granted after applying the selected second security mode.

15. The device of claim 11, wherein the one or more data processing apparatus are operable to verify receipt of the additional authentication mechanism before granting external access to the resources.

16. The device of claim 11, wherein the external access includes at least one of user access or access by a system external to the device.

17. One or more non-transitory computer-readable media storing instructions that are operable when executed by one or more data processing apparatus to perform operations at a first device, the operations comprising:

securing resources on the first device according to a first security mode, wherein the resources on the first device are grouped into a plurality of subsets of resources, each of the plurality of the subsets of resources includes a plurality of resources having a common management scheme, and the first security mode is one of a plurality of distinct security modes;

while securing resources on the first device according to the first security mode, detecting information encoded in a wireless authenticator device based on a wireless interaction between the first device and the wireless authenticator device, wherein the information includes one or more accessibility attributes and the one or more accessibility attributes include a resource attribute and an authentication attribute, the resource attribute indicating whether external access to a plurality of resources having a common management scheme is granted or declined, the authentication attribute indicating an additional authentication mechanism that is required before allowing external access to the plurality of resources, and the additional authentication mechanism being independent of using the wireless authenticator device;

based on the one or more accessibility attributes, selecting a second security mode associated with the wireless authenticator device, wherein the second security mode is different than the first security mode; and applying the selected second security mode, wherein applying the selected second security mode comprising securing the plurality of resources having the common management scheme according to the resource attribute.

18. The one or more computer-readable media of claim 17, wherein external access to the resources is declined when the resources are secured according to the first security mode, and external access to the resources is granted after applying the selected second security mode.

19. The one or more computer-readable media of claim 17, wherein the operations comprise verifying receipt of the additional authentication mechanism before granting external access to the resources.

20. The one or more computer-readable media of claim 17, wherein the external access includes at least one of user access or access by a system external to the first device.

\* \* \* \* \*

UNITED STATES PATENT AND TRADEMARK OFFICE
CERTIFICATE OF CORRECTION

PATENT NO. : 9,552,472 B2  
APPLICATION NO. : 13/904698  
DATED : January 24, 2017  
INVENTOR(S) : Adams et al.

Page 1 of 1

It is certified that error appears in the above-identified patent and that said Letters Patent is hereby corrected as shown below:

In the Claims

Column 19, Line 66, Claim 1, delete "includes" and insert -- include --, therefor.

Column 20, Line 14, Claim 1, delete "resource" and insert -- resources --, therefor.

Signed and Sealed this
Twenty-fifth Day of April, 2017

Michelle K. Lee
*Director of the United States Patent and Trademark Office*